(No Model.)  2 Sheets—Sheet 1.

B. GUNNARSON.
BOOK REST.

No. 465,262.  Patented Dec. 15, 1891.

Witnesses
J. H. Shumway
Lillian D. Kelsey

Benjamin Gunnarson
Inventor
By attys
Earle Seymour

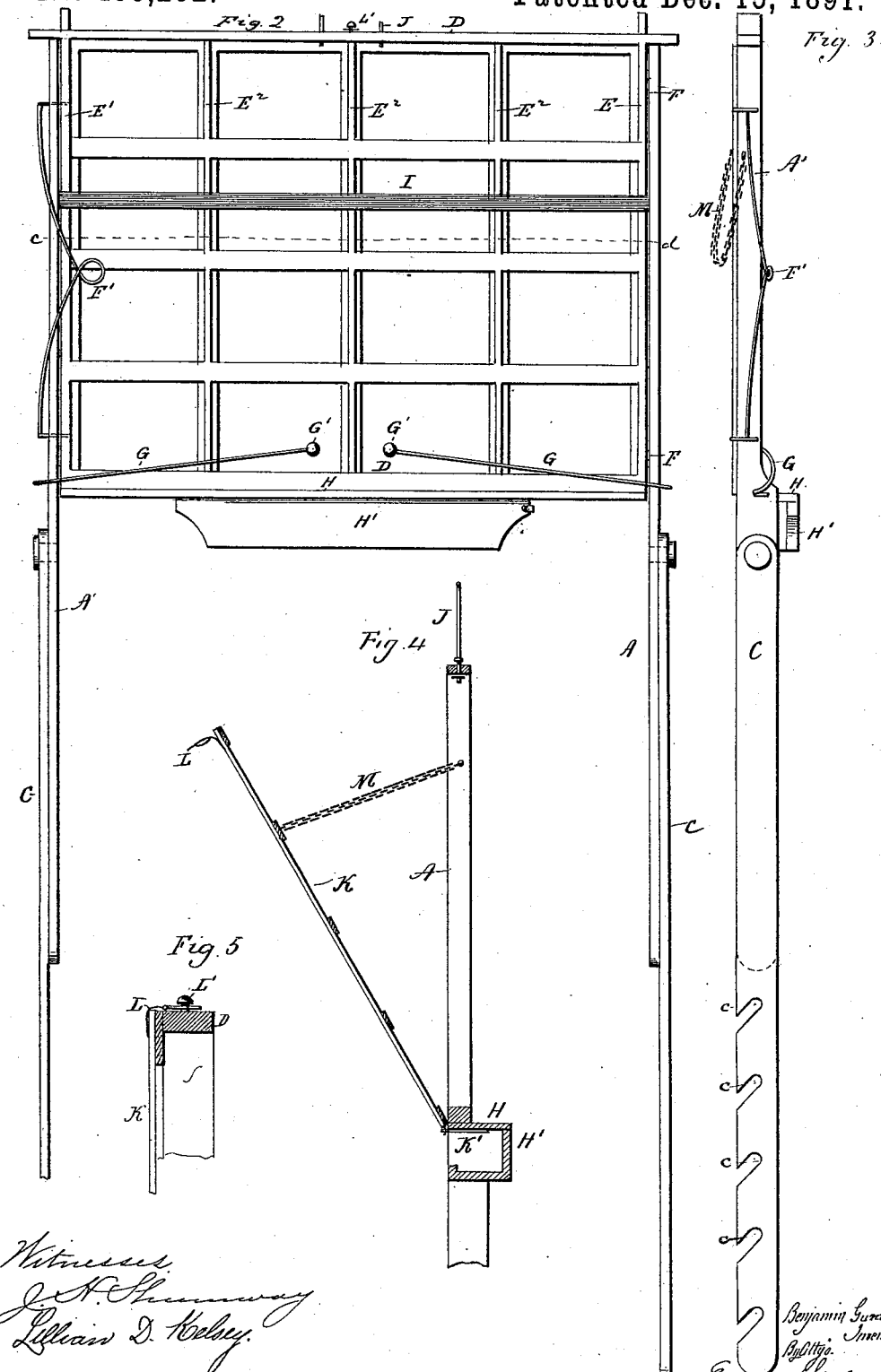

UNITED STATES PATENT OFFICE.

BENJAMIN GUNNARSON, OF WEST HAVEN, CONNECTICUT, ASSIGNOR OF ONE-HALF TO BENGT GUNNARSON, OF SAME PLACE.

BOOK-REST.

SPECIFICATION forming part of Letters Patent No. 465,262, dated December 15, 1891.

Application filed August 19, 1891. Serial No. 403,131. (No model.)

*To all whom it may concern:*

Be it known that I, BENJAMIN GUNNARSON, of West Haven, in the county of New Haven and State of Connecticut, have invented a new Improvement in Book-Rests; and I do hereby declare the following, when taken in connection with accompanying drawings and the letters of reference marked thereon, to be a full, clear, and exact description of the same, which said drawings constitute part of this specification, and represent, in—

Figure 6:
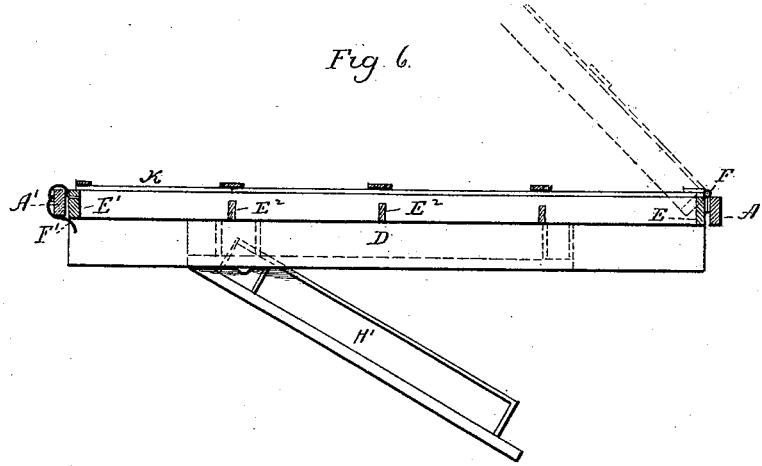
Figure 1:
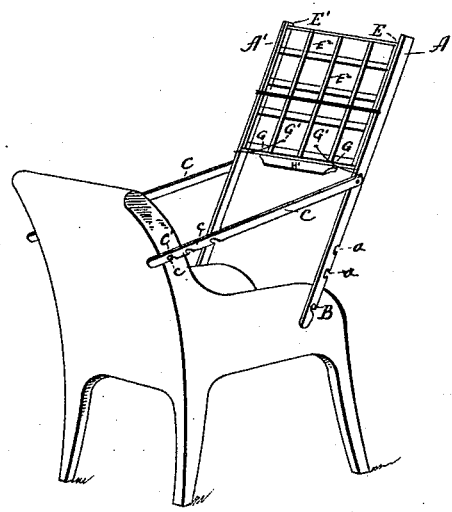

Figure 1, a perspective view of a book-rest constructed in accordance with my invention and shown as applied to an easy-chair; Fig. 2, a view of the device in front elevation when folded up as when not in use; Fig. 3, a similar view of the device in side elevation; Fig. 4, a broken view of the device in vertical transverse section, showing it hung up with its front to the wall and with its hinged leaf let down to form a receptacle for papers; Fig. 5, a detailed view of the device in transverse section on line $a\,b$ of Fig. 2, and showing a means for securing the hinged leaf in its closed position; Fig. 6, a view of the device in horizontal section on the line $c\,d$ of Fig. 2, and showing the rack swung open by broken lines and the pencil-box swung open by full lines.

My invention relates to an improvement in book-rests, the object being to produce a complete and effective device adapted to be attached to and removed from a chair, having a wide range of adjustment, and constructed to be useful as a receptacle for papers and the like when not in use as a book-rest.

With these ends in view my invention consists in a book-rest having certain details of construction and combinations of parts, as will be hereinafter described, and pointed out in the claims.

As herein shown, the device has two long side pieces A and A' corresponding to each other, and having their lower ends provided with a series of bayonet-slots $a$ entering them from their inner edges, and adapting the said ends of the side pieces to be engaged with headed pins B, inserted into the arms of a chair, as shown by Fig. 1 of the drawings, only one of the said pins being shown. Two long arms C C are pivoted at their upper ends to the said side pieces at points just below the longitudinal centers thereof, the said arms extending considerably below the lower ends of the side pieces, and provided upon their under faces with double-ended bayonet-slots $c\,c$, adapting the arms to be engaged with headed pins C', located in the back of the chair, only one of the said pins being shown and that in Fig. 1 of the drawings. It will be understood, of course, that I do not limit myself to the use of any particular form of slots in the said side pieces and arms, and, indeed, if more convenient, I may employ some other means of securing the side pieces and arms to a chair; but the slots afford a simple and convenient way of applying and removing the device from a chair which is adapted to receive the device by simply inserting suitable pins into its arms and back. These pins will not deface the chair and may readily be removed, if desired.

A book-rack located between the upper ends of the side pieces is composed, as herein shown, of an upper cross-piece D, a corresponding lower cross-piece D', an upright end piece E, a corresponding end piece E', and three intermediate uprights $E^2\,E^2\,E^2$, the ends of which are attached to the cross-pieces D D', before mentioned. As herein shown, the said rack is attached by hinges F F to the upper end of the side piece A, the said hinges being also connected with the upright E of the rack, which is maintained in its closed and normal position by means of a spring-clasp F', formed of wire, the ends whereof are inserted into the upright E'. The said clasp is shaped to extend forward around the upper end of the side piece A' and over the front of the adjacent end of the rack. The central portion of the said clasp is shaped to form a loop, by means of which the clasp is operated to spring it away from the side piece A' to permit the rack to be swung on its hinges, as shown by broken lines in Fig. 6 of the drawings, whereby the occupant of the chair may leave it without detaching the device and seat himself again, after which he will seize the loop of the clasp and spring the same back over the side piece A' again, as shown by Fig. 2 of the drawings. Two long spring-arms G G, having knobs G' G' formed at their inner ends, are attached at their outer ends to the side pieces A and A', respectively. These arms are designed to be engaged with the leaves of the book on the rack, so as to hold them open. If desired, they may be attached to the rack itself in preference to being secured to the side pieces. A shelf H, secured to the lower face of the lower cross-piece D of the rack and extending parallel with the same and projecting forward therefrom, supports the book or other object placed upon the rack, while a long narrow box H', pivoted at one end to the under face of the said shelf, is provided to receive pencils, erasers, and other articles which it may be found convenient to use in using the book-rest, the shelf being retained in its closed position by means of a small spring $h$. An elastic strap I, having its ends looped around the uprights E and E' of the rack, is provided for being passed over an open book or paper to hold the same in adjustment. This band may be moved up and down by sliding it on the said uprights E and E', as may be required. When the device is not in use as a book-rest, it may be conveniently hung upon the wall by a suspension-loop J, located in the center of the upper cross-piece D of the rack, this loop being vertically movable, so that it may be pressed inward and out of the way when the device is being used as a book-rest.

A leaf K, formed of intersecting vertical and horizontal bars of light-wood-work, is secured at its lower edge by hinges K', as shown by Fig. 4 of the drawings, to the under face of the shelf H. This hinged leaf is normally folded against the back of the rack and so held by means of a loop L, attached to its upper end and engaged with a stud L', situated in the center of the upper cross-piece D, as shown by Fig. 5 of the drawings. Chains M M (shown by Figs. 3 and 4 of the drawings) connect the upright pieces E and E' of the rack with the opposite edges of the said leaf, near the upper end thereof, and prevent the same from opening more than necessary to form a pocket or receptacle for papers, as shown by Fig. 4 of the drawings. By suspending the book-rest from the wall by means of its suspension-loop J and with its front face against the wall it may be converted into a very convenient newspaper-rack by disengaging the loop L from the stud L' and allowing the hinged leaf to fall into its open position.

It is not essential that the rack be hinged to one of the side pieces and held in place at its opposite end by means of a spring-clasp; but that construction makes the device more convenient in enabling the person using it to leave and reseat himself in his chair without detaching the device therefrom. If desired, the rack may be rigidly secured to or framed in with the upper ends of the side pieces A and A' of the device. It is apparent, also, that the details of the device may be changed in form and arrangement without departing from my invention. I would therefore have it understood that I do not limit myself to the exact construction herein shown and described, but hold myself at liberty to make such departures therefrom as fall within the spirit and scope of my invention.

Having fully described my invention, what I claim as new, and desire to secure by Letters Patent, is—

1. In a book-rest, the combination, with two side pieces adapted at their lower ends to be attached to a chair, of two arms pivoted at their upper ends to the said side pieces and adapted at their lower ends to be attached to a chair, and a book-rest hinged at one end to the upper end of one of the said side pieces and provided with means for attaching its opposite end to the other side piece, substantially as described.

2. In a book-rest, the combination, with two side pieces adapted at their lower ends to be attached to a chair, of two arms pivoted at their upper ends to the said side pieces and adapted at their lower ends to be attached to a chair, and a book-rack attached to the upper ends of said side pieces having a leaf hinged to its lower edge and folding against its rear face and forming a receptacle for papers when open, substantially as described.

3. In a book-rest, the combination, with two side pieces adapted at their lower ends to be attached to a chair, of two arms pivoted at their upper ends to the said side pieces and adapted at their lower ends to be attached to a chair, a book-rack hinged to one of the said side pieces, means for securing the opposite end of the book-rack to the other side piece, a leaf hinged to the lower edge of the rack and folding against its rear face, a pencil-case attached to the lower edge of the said rack, and a suspension-loop attached to the upper edge thereof, substantially as described.

In testimony whereof I have signed this specification in the presence of two subscribing witnesses.

BENJAMIN GUNNARSON.

Witnesses:
FREDERIC C. EARLE,
LILLIAN D. KELSEY.